United States Patent [19]

Wakamiya et al.

[11] 3,871,007

[45] Mar. 11, 1975

[54] SEMICONDUCTOR INTEGRATED CIRCUIT

[75] Inventors: Kinji Wakamiya, Tokyo; Isamu Kobayashi, Kanagawa-ken, both of Japan

[73] Assignee: Sony Corporation, Tokyo, Japan

[22] Filed: Dec. 2, 1969

[21] Appl. No.: 881,452

[30] Foreign Application Priority Data

Dec. 5, 1968 Japan ................................ 43-89227

[52] U.S. Cl. ......................... 357/49, 357/59, 357/63

[51] Int. Cl. ............................................ H01l 19/00

[58] Field of Search ..................................... 317/235

[56] References Cited

UNITED STATES PATENTS 3,320,485 5/1967 Buie ................................... 317/235

3,335,038 8/1967 Doo ................................... 317/235

OTHER PUBLICATIONS

IBM Tech. Discl. Bul., "Simultaneous Diffusion Process into Polycrystalline and Monocrystalline Silicon" by Boss et al., Vol. 10, No. 2, July 1967, pages 164–165.

*Primary Examiner*—Martin H. Edlow
*Attorney, Agent, or Firm*—Hill, Gross, Simpson, Van Santen, Steadman, Chiara & Simpson

[57] ABSTRACT

A semiconductor integrated circuit having a plurality of single crystal regions which are surrounded by vapor growth polycrystaline regions of higher resistivity than that of the single crystal regions.

1 Claim, 18 Drawing Figures

INVENTORS
KINJI WAKAMIYA
ISAMU KOBAYASHI
BY Hill, Sherman, Meroni, Gross & Simpson ATTORNEYS INVENTORS
KINJI WAKAMIYA
ISAMU KOBAYASHI
BY Hill, Sherman, Meroni, Gross & Simpson ATTORNEYS

INVENTORS
KINJI WAKAMIYA
ISAMU KOBAYASHI

BY Hill, Sherman, Meroni, Gross & Simpson ATTORNEYS

INVENTORS
KINJI WAKAMIYA
ISAMU KOBAYASHI
BY Hill, Sherman, Meroni, Gross & Simpson ATTORNEYS

SEMICONDUCTOR INTEGRATED CIRCUIT

CROSS REFERENCE TO RELATED APPLICATIONS

The U.S. Pat. application Ser. No. 780,702, filed Dec. 3, 1968, entitled "SEMICONDUCTOR INTEGRATED CIRCUIT AND METHODS OF MAKING THE SAME" and the U.S. Pat. application Ser. No. 872,335, filed Oct. 29, 1969, now U.S. Pat. No. 3,617,822 entitled "SEMICONDUCTOR INTEGRATED CIRCUIT AND METHOD OF MAKING THE SAME," both filed by the same assignors of this application, disclose the same subject matter of this application.

This is a continuation-in-part application of the above-mentioned two copending applications.

BACKGROUND OF THE INVENTION

1. Field of the Invention

This invention relates to an improved semiconductor integrated circuit and a method of making the same, utilizing high resistance polycrystalline regions to isolate components of the integrated circuit from each other.

2. Description of the Prior Art

In semiconductor integrated circuits components must be isolated from adjacent ones as is well-known in the art. This isolation has took place in the art by means of a PN function isolation, dielectric isolation, air isolation, beam lead or like method. With the PN junction isolation method, isolation regions are formed by diffusion techniques, which takes an appreciable amount of time for the diffusion and further the diffused isolation regions between adjacent components impose a limitation upon the density of the components. This introduces a difficulty in the high-speed response due to parasitic capacity caused by interconnections, electrodes and the junctions for isolation.

SUMMARY OF THE INVENTION

One object of this invention is to provide an improved semiconductor integrated circuit and a method of making the same.

Another object of this invention is to provide a closely packed integrated circuit and a method of making the same.

A further object of this invention is to provide a semiconductor integrated circuit and a method of making the same, utilizing the fact that the resistance in a polycrystalline region formed by the vapor growth method is greater than that in a single crystal region.

Still a further object of this invention is to provide a high-speed semiconductor integrated circuit and a method of making the same.

DESCRIPTION OF THE PREFERRED EMBODIMENTS

For a better understanding of this invention a description will be given first of a conventional method for the manufacture of a semiconductor integrated circuit with reference to FIG. 1.

Figure 1A:
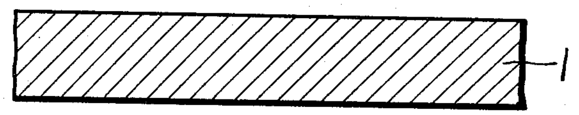
PRIOR ART Fig. 1A
FIGS. 1A to 1E are enlarged cross-sectional views showing a sequence of steps involved in the manufacture of a semiconductor integrated circuit according to a prior art method.

The manufacture begins with the preparation of, for example, a silicon single crystal semiconductor substrate 1 (FIG. 1A).

Figure 1B:
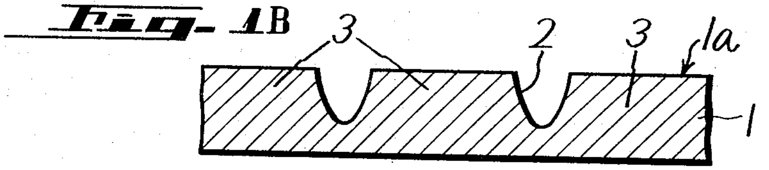

One surface 1*a* of the substrate 1 is subjected to mesa etching to form a plurality of mesas 3 surrounded by mesa grooves 2 (FIG. 1B).

Figure 1C:
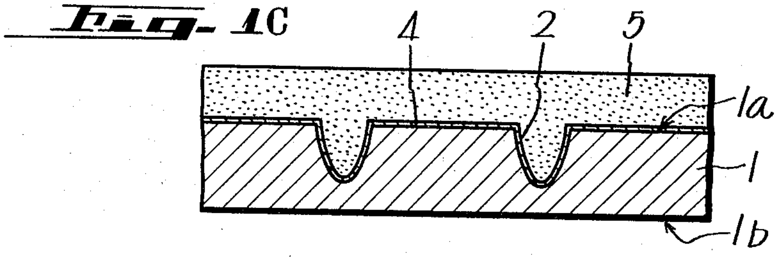

Then, an insulating material such as glass or the like is deposited on the surface 1*a* of the substrate 1 filling the grooves 2 or an insulating material layer 4 as of silicon dioxide is formed on the entire area of the surface 1*a* of the substrate 1 including the grooves 2 and a reinforcement layer 5 of the same semiconductor material as the substrate 1 is formed on the insulating material layer 4 by vapor growth techniques (FIG. 1C).

Figure 1D:
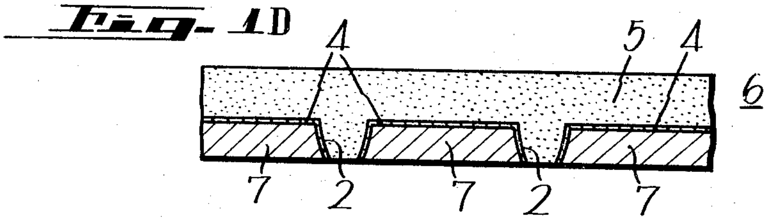

Following this, the substrate 1 is selectively removed from its underside 1*b* to a plane crossing the mesa grooves 2 by means of mechanical cutting and polishing and/or chemical etching (FIG. 1D).

This results in the provision of a semiconductor integrated circuit wafer 6 consisting of a plurality of island regions 7 which are buried in the reinforcement layer 5 and are electrically isolated from one another by the layer 5 or the insulating material layer but mechanically integrated together by the layer 5.

Figure 1E:
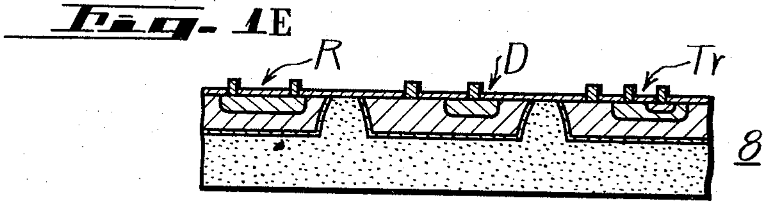

After this, circuit elements, for example, a transistor T*r*, a diode D and a resistor R are respectively formed in the regions 7 and these circuit elements are interconnected as predetermined by internal wirings, thus providing a semiconductor integrated circuit 8 (FIG. 1E).

In this case the circuit elements are isolated from one another by the insulating material, so that the semiconductor integrated circuit constructed as above described has substantially no parasitic effect of the capacity parasitic to the junctions as in an integrated circuit of the so-called junction isolation type isolating circuit elements by the PN junctions and the above semiconductor integrated circuit is of particular utility when employed as a high-frequency, high-speed switch.

In the foregoing conventional method, however, the island regions 7 are isolated from one another by the mesa grooves 2 as previously described with FIG. 1B, in which case the so-called side-etching is caused during the formation of the mesa grooves 2 to cause an increase in the width of the mesa grooves and consequently in the spacing between the circuit elements. By the way, the mesa grooves 2 are approximately 20 to 100 microns wide and accordingly the spacing between the circuit elements is unnecessarily great to prevent the formation of high-density integrated circuits.

The present invention is to provide a method of making a semiconductor integrated circuit which is free from the aforementioned defect encountered in the prior art.

Referring to FIG. 2, a description will be given of the manufacture of a semiconductor integrated circuit in accordance with one example of this invention. The manufacture begins with the provision of a single crystal semiconductor substrate composed of P- or N-type or intrinsic semiconductor, for example, silicon (FIG. 2A).

The next step consists in the formation of seeding sites 202 for development of a polycrystalline semiconductor material (including an amorphous material) on one surface 201*a* of the substrate 201 in the form of a fretwork to define therein a plurality of areas. The seeding sites 202 may be formed by a scratching, sandblast or like method to disturb the regularity of crystal lattice in the semiconductor substrate or may be formed of amorphous solids or polycrystalline materials by, for example, the vapor deposition of silicon, silicon dioxide.

Figure 2A:
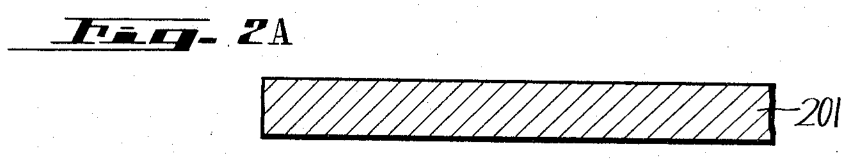
FIGS. 2A to 2F and 4A to 4F are enlarged cross-sectional views of the successive steps involved in producing semiconductor integrated circuits in accordance with examples of this invention.
Figure 2B:
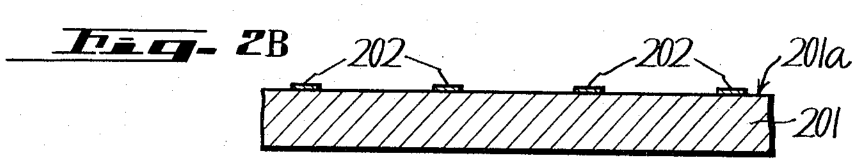
Figure 2C:
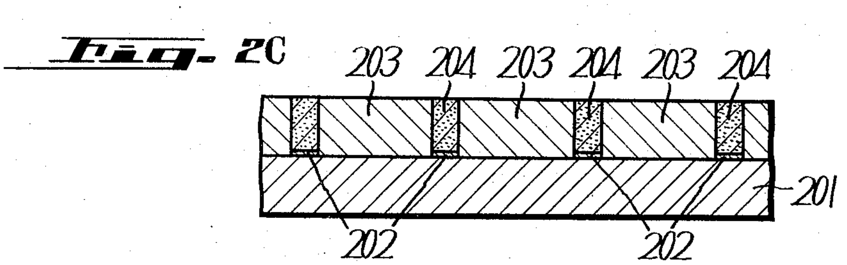

Subsequent to the formation of the seeding sites 202, a vapor growth semiconductor layer 203 is formed on the semiconductor substrate 201 and the seeding sites 202 by vapor growth techniques from an N-type semiconductor of an impurity concentration of less than $7 \times 10^{17}$ atoms/$cm^3$ under conditions which permit vapor growth of a single crystal (FIG. 2C). The resulting vapor growth semiconductor layer 203 consists of single crystal layers directly grown on the substrate 201 and polycrystalline layers 204 grown on the seeding site 202.

Figure 2D:
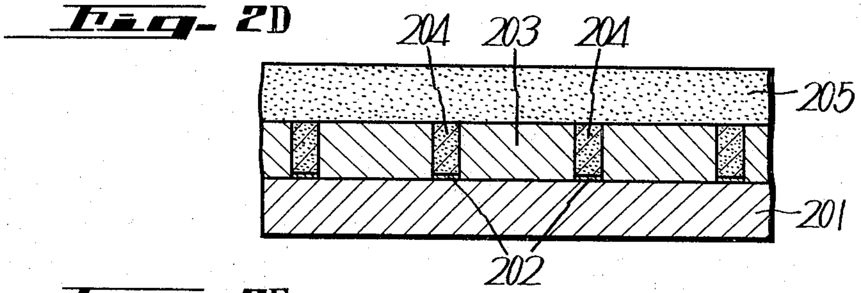

Then, a polycrystalline semiconductor layer 205 is formed about 50 microns thick on the semiconductor layer 203 by a suitable selection of temperature conditions (FIG. 2D). The impurity concentration of the polycrystalline semiconductor layer 205 is selected to be less than $7 \times 10^{17}$ atoms/$cm^3$. In this case it is also possible that a seeding site of the same structure as the aforementioned seeding sites 202 is formed over the entire area of the semiconductor layer 203.

Figure 2E:
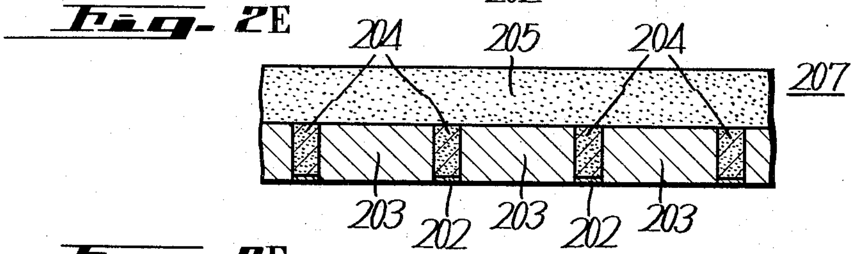
Figure 2F:
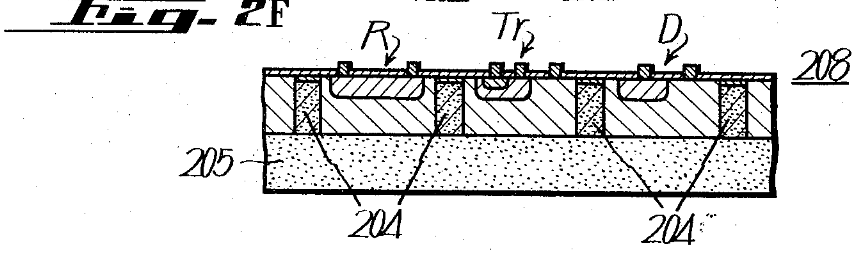

Thereafter, the semiconductor substrate 201 is removed by etching and/or mechanical means to provide a semiconductor integrated circuit wafer 207 which has formed therein a plurality of single crystal semiconductor regions 206 isolated from one another by the polycrystalline layers 205 and 204 (FIG. 2E). Finally, circuit elements, for example, a transistor T*r*, a diode D and a resistor R are respectively formed in the regions 203 and are interconnected as predetermined to provide a semiconductor integrated circuit (FIG. 2F).

Figure 3:
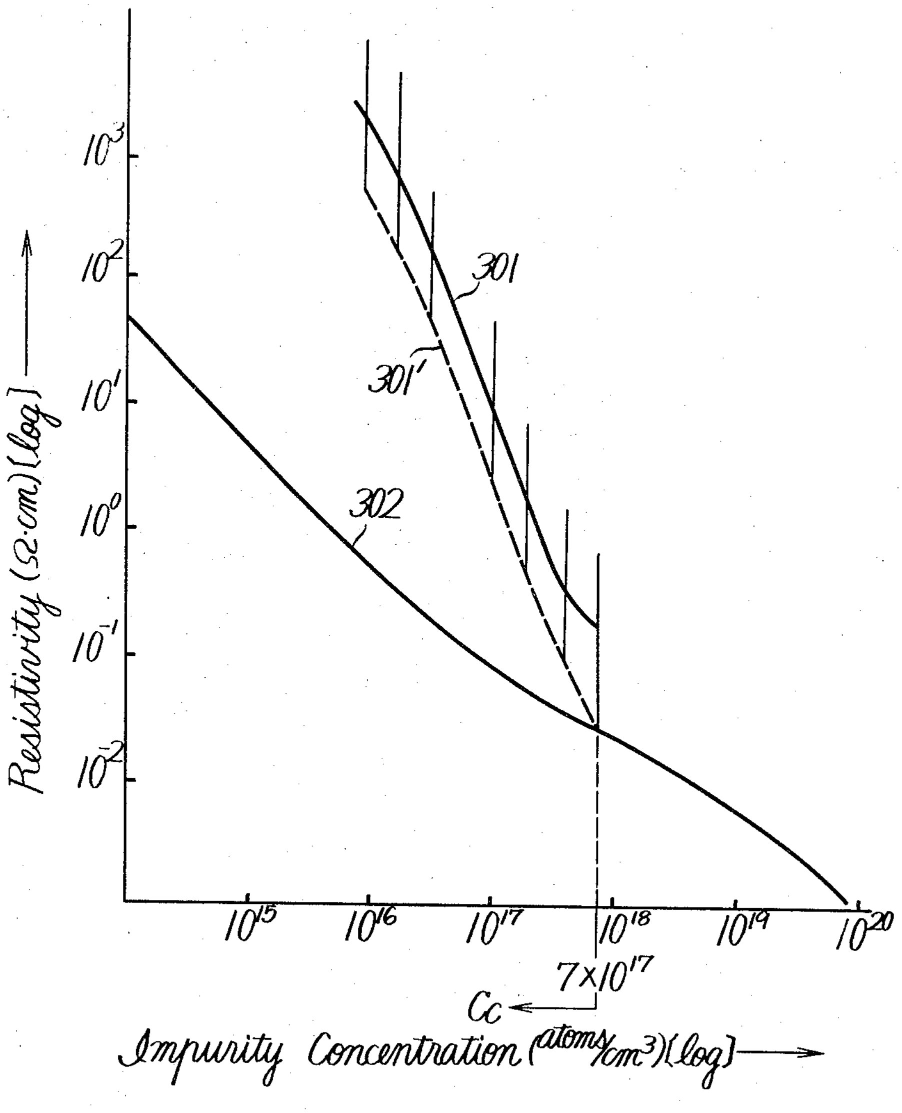
FIG. 3 is a graph showing impurity concentration to resistivity characteristics of single crystal and polycrystalline semiconductors, for explaining this invention.

The polycrystalline layers 205 and 204 of the semiconductor integrated circuit thus produced are well insulated from one another, and hence the single crystal regions 206 are electrically isolated from one another. Namely, the single crystal and polycrystalline semiconductors are greatly different in resistivity from each other as shown in FIG. 3 when doped with the same amount of an impurity. In FIG. 3 the abscissa represents the doping impurity concentration in atoms per cu. cm. and the ordinate the resistivity in ohm cm. The curves 301 and 302 respectively show the impurity concentration to resistivity characteristics of the polycrystalline and single crystal semiconductors doped with arsenic. Vertical lines crossing the curve 301 indicate the range of dispersion in experimental values and the curve 301' the lower limit of the dispersion. The impurity concentration at which the resistivities of the polycrystalline and single crystal semiconductors are equal to each other is referred to as a critical concentration C*c*. In view of the dispersion in the resistivity of the polycrystalline semiconductor, the impurity concentration at the intersecting point of the curves 301' and 302 is indicated as the critical concentration in this case. As will be apparent from the graph, with the impurity concentration of the semiconductor layers 203 and 205 being selected to be less than the critical concentration of $7 \times 10^{17}$ atoms/$cm^3$, the layers 203 and 205 exhibit so high a degree of resistivity as to be regarded as insulators, thus ensuring electrical isolation of the island regions 206.

Even in the event that the impurity concentration of the polycrystalline semiconductor region is equal to that of the single crystal semiconductor region, if the impurity concentration of the polycrystalline region is lower than the critical concentration C*c* indicated in FIG. 1, the resistivity of the polycrystalline region is considered to exceed that of the single crystal region for the following reasons.

i. The impurity is precipitated on the surfaces of fine single crystals (for their grain boundaries) forming the polycrystals.
ii. Carriers are trapped on the grain boundaries to decrease the carrier concentration contributing to conduction.
iii. In the polycrystals the mean free path of the carrier is short and its mobility is low.

As has been described in the foregoing, according to this invention the island regions 206 are isolated from one another by the polycrystalline regions 204 and 205 and the width of the polycrystalline regions can be rendered to be as narrow as about 5 to 20 microns and hence are remarkedly narrower than the spacing between the circuit elements of the semiconductor integrated circuit above described with FIG. 1. Consequently, this invention is advantageous in that the circuit elements can be closely packed or that if the overall area for the circuit elements is constant, the sites for the elements can be increased to allow ease in the making thereof.

Further, the present invention does not employ the PN junctions for the insulation of the circuit elements, and hence provides an integrated circuit of excellent high-frequency, high-speed characteristics as mentioned at the beginning of this specification.

Figure 4A:
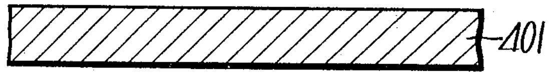
Figure 4B:
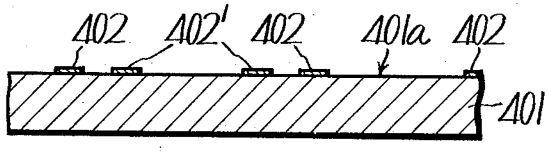
Figure 4C:
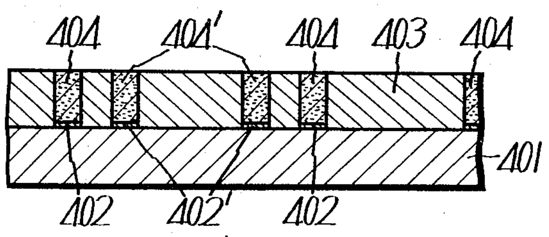

Moreover, in the formation of a circuit element such as a transistor or diode this invention enables the formation of a high conductivity region for the collector saturated resistance of the transistor or the series resistance of the diode without the necessity of any special process therefor. This will be described with reference to FIG. 4. The first step is to prepare a semiconductor substrate 401 (FIG. 4), on one surface 401*a* of which seeding sites 402 for polycrystalline development are formed in the form of, for example, a fretwork and, at the same time, similar seeding site 402' is formed, for example, in an annular form within that areas, surrounded by the seeding sites 402, in which a high conductivity region will be ultimately formed (FIG. 4B).

The next step consists in the vapor growth of a semiconductor layer 403 (FIG. 4C), in which case polycrystalline portions 404 and 404' are formed on the seeding sites 402 and 402'.

Figure 4D:
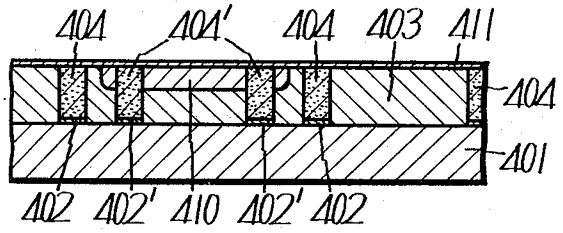
Figure 4E:
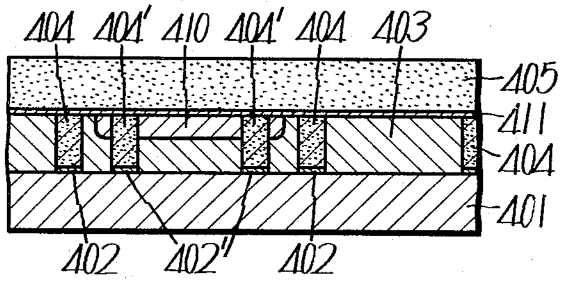

Following this, a high concentration impurity of the same conductivity type as that of the semiconductor layer 403 is selectively diffused shallow into the semiconductor layer 403 including the polycrystalline portion 404' to form a low resistivity region 410 (FIG. 4D). Reference numeral 411 indicates an amorphous layer as of silicon dioxide which was used as a diffusion mask for the selective diffusion of the above impurity and has been formed during the diffusion process.

Figure 4F:
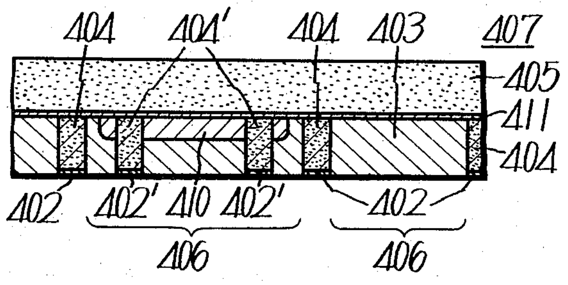

Thereafter, a polycrystalline semiconductor layer 405 is formed (FIG. 4E) and the substrate 401 is then removed in the same manner as that previously described, thus providing a semiconductor integrated circuit wafer 407 (FIG. 4F). In this case the low resistivity region 410 contiguous to the polycrystalline portion 404' is of high impurity concentration and the impurity diffusion velocity in the polycrystal is greater than in the single crystal, so that the impurity present in the region 410 is caused to diffuse into the portion 404' by the heating for the impurity diffusion to form the region 410 and by the heating for the vapor growth of the semiconductor layer 405 and the region 410 has low resistivity and high conductivity. Accordingly, a diode or transistor is formed in the single crystal portion of the region 406 having the polycrystalline portion 404' and one electrode of the diode or the collector electrode of the transistor is deposited on the portion 404', by which a resistance connected in series to the diode or the collector saturated resistance can be decreased.

In the examples of FIGS. 2 and 4, it is possible to remove the polycrystalline layers 205 and 405 by means of etching, utilizing high etching velocity of the polycrystal, after the circuit elements have been formed in the island regions 206 and 406 and interconnected to provide an integrated circuit. In such a case the circuit elements are completely insulated and isolated from one another.

It will be apparent that many modifications and variations may be effected without departing from the scope of the novel concepts of this invention.

We claim as our invention:

1. An integrated circuit wafer having islands of monocrystalline semiconductor material separated from each other by polycrystalline regions comprising a supporting layer of high resistivity polycrystalline silicon material, a continuous layer of semiconductor material having regions of high resistivity polycrystalline silicon material formed over predetermined areas of said supporting layer, and monocrystalline regions formed over the remaining areas of said supporting layer, said polycrystalline regions and said polycrystalline supporting layer having an impurity concentration of less than $7 \times 10^{17}$ atoms/$cm^3$, said polycrystalline supporting layer and said polycrystalline regions of said epitaxial layer being the sole means of electrically isolating said monocrystalline regions from each other.

* * * * *